United States Patent
Lin et al.

(10) Patent No.: US 10,989,870 B2
(45) Date of Patent: Apr. 27, 2021

(54) TRANSMITTER OPTICAL SUBASSEMBLY WITH HERMETICALLY-SEALED LIGHT ENGINE AND EXTERNAL ARRAYED WAVEGUIDE GRATING

(71) Applicant: Applied Optoelectronics, Inc., Sugar Land, TX (US)

(72) Inventors: Kai-Sheng Lin, Sugar Land, TX (US); Kevin Liu, Houston, TX (US); I-Lung Ho, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 16/116,087

(22) Filed: Aug. 29, 2018

(65) Prior Publication Data

US 2020/0073052 A1    Mar. 5, 2020

(51) Int. Cl.
| | |
|---|---|
| *G02B 6/34* | (2006.01) |
| *G02B 6/12* | (2006.01) |
| *G02B 6/42* | (2006.01) |
| *H04B 10/50* | (2013.01) |
| *H04B 10/40* | (2013.01) |
| *H04J 14/02* | (2006.01) |

(52) U.S. Cl.
CPC ........ *G02B 6/12011* (2013.01); *G02B 6/4246* (2013.01); *H04B 10/40* (2013.01); *H04B 10/503* (2013.01); *H04J 14/028* (2013.01)

(58) Field of Classification Search
CPC .. G02B 6/12011; G02B 6/4246; H04B 10/40; H04B 10/503; H04J 14/028
USPC .............. 385/14, 31, 37, 88, 89, 92, 94, 139
See application file for complete search history.

(56) References Cited

U.S. PATENT DOCUMENTS

| 7,638,353 B2 | 12/2009 | Beernink et al. |
| 7,798,820 B2 | 9/2010 | Hong |

(Continued)

OTHER PUBLICATIONS

U.S. Office Action dated Nov. 19, 2018, U.S. Appl. No. 15/963,246, 15 pgs.

(Continued)

*Primary Examiner* — Kaveh C Kianni
*Assistant Examiner* — Hung Q Lam
(74) *Attorney, Agent, or Firm* — Grossman Tucker Perreault & Pfleger, PLLC; Norman S. Kinsella (57) ABSTRACT

In general, a TOSA consistent with the present disclosure includes a light driving circuit coupled to a hermetically-sealed light engine. The hermetically-sealed light engine includes a housing defined by a plurality of sidewalls. The housing defines a cavity that is hermetically-sealed to prevent introduction of contaminants that would otherwise reduce optical power. The hermetically-sealed light engine optically couples to an external arrayed waveguide grating (AWG), or other multiplexing device, by way of an optical receptacle. The optical receptacle can include a waveguide implemented external to the hermetically-sealed cavity and can include, for instance, an optical isolator, fiber stub, and fiber ferrule section. Thus, the external AWG and associated external optical coupling components advantageously allow for the hermetically-sealed light engine to have a cavity with dimensions relatively smaller than other approaches that dispose an AWG and associated components within a hermetically-sealed cavity.

18 Claims, 6 Drawing Sheets

(56) References Cited

U.S. PATENT DOCUMENTS

| | | | |
|---|---|---|---|
| 9,614,620 | B2 | 4/2017 | Ho et al. |
| 2001/0024551 | A1 | 9/2001 | Yonemura et al. |
| 2004/0163836 | A1 | 8/2004 | Kumar et al. |
| 2005/0105915 | A1 | 5/2005 | Light |
| 2005/0175350 | A1 | 8/2005 | Hartzell et al. |
| 2005/0225955 | A1 | 10/2005 | Grebenkemper et al. |
| 2005/0286906 | A1 | 12/2005 | Togami et al. |
| 2007/0237472 | A1 | 10/2007 | Aronson et al. |
| 2011/0188863 | A1 | 8/2011 | Mason et al. |
| 2012/0301152 | A1 | 11/2012 | Edwards et al. |
| 2013/0114629 | A1 | 5/2013 | Firth et al. |
| 2014/0152373 | A1 | 6/2014 | Romas, Jr. et al. |
| 2015/0162989 | A1 | 6/2015 | Oomori |
| 2015/0162990 | A1 | 6/2015 | Daiber et al. |
| 2015/0256261 | A1* | 9/2015 | Ho ............... G02B 6/43 398/139 |
| 2016/0139477 | A1 | 5/2016 | Jack et al. |
| 2017/0059796 | A1 | 3/2017 | Huang et al. |
| 2017/0272169 | A1 | 9/2017 | Ho et al. |
| 2018/0287705 | A1* | 10/2018 | Lin ............... H04B 10/40 |
| 2018/0331494 | A1* | 11/2018 | Ho ............... H01S 5/02252 |

OTHER PUBLICATIONS

PCT Search Report and Written Opinion dated Jul. 12, 2019, PCT Application No. PCT/US19/29404, 10 pgs.

\* cited by examiner

TRANSMITTER OPTICAL SUBASSEMBLY WITH HERMETICALLY-SEALED LIGHT ENGINE AND EXTERNAL ARRAYED WAVEGUIDE GRATING

RELATED APPLICATIONS

This application is related to co-pending U.S. application Ser. No. 15/963,246 titled "Transmitter Optical Subassembly with Trace Routing to Provide Electrical Isolation Between Power and RF Traces" filed on Apr. 26, 2018, which is herein incorporated by reference in its entirety.

TECHNICAL FIELD

The present disclosure relates to optical communications and more particularly, to a transmitter optical subassembly (TOSA) with a hermetically-sealed light engine housing and an arrayed waveguide grating (AWG) disposed external to the hermetically-sealed light engine housing.

BACKGROUND INFORMATION

Optical transceivers are used to transmit and receive optical signals for various applications including, without limitation, internet data center, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to thermal management, insertion loss, and manufacturing yield.

Optical transceiver modules generally include one or more transmitter optical subassemblies (TOSAs) for transmitting optical signals. TOSAs can include one or more lasers to emit one or more channel wavelengths and associated circuitry for driving the lasers. Some optical applications, such as long-distance communication, can require TOSAs to include hermetically-sealed housings with arrayed waveguide gratings, temperature control devices, laser packages and associated circuitry disposed therein to reduce loss and ensure optical performance. However, the inclusion of hermetically-sealed components increases manufacturing complexity, cost, and raises non-trivial challenges.

BRIEF DESCRIPTION OF THE DRAWINGS

These and other features and advantages will be better understood by reading the following detailed description, taken together with the drawings wherein.

DETAILED DESCRIPTION

As discussed above, some TOSAs can reach optical transmission distances of up to 10 km or more. Such TOSAs may be suitable for use in C form-factor pluggable (CFP), CFP2, CFP4 and quad small form-factor pluggable (QSFP) applications. In general, such TOSAs include a hermetic-sealed package (or housing) with an LC receptacle (or other suitable port) for optical coupling. The hermetic-sealed package can house laser packages, e.g., electro-absorption modulator integrated lasers (EMLs), power monitors photodiodes (PDs), thermoelectric coolers (TECs), an optical multiplexer such as an arrayed waveguide grating (AWG) for multiplexing multiple channel wavelengths, and electrical interconnects such as flexible printed circuit boards, and optical interconnects such as fiber stubs. Hermetic-sealed packages can include cavities specifically designed to house such components in a manner that optimizes the space constraints and promotes thermal communication. However, manufacturing hermetic-sealed packages with the dimensions necessary to fit the components of the light engine increases manufacturing cost and complexity. Moreover, significant amounts of power may be consumed cooling/heating the components within a hermetic-sealed cavity, e.g., by one or more TECs, which can ultimately reduce transmitter efficiency.

Thus, the present disclosure is generally directed to a TOSA having a hermetically-sealed housing that includes a laser arrangement disposed therein for outputting a plurality of channel wavelengths and a multiplexing device, e.g., an arrayed waveguide grating (AWG), filter, or other suitable device, disposed external to the hermetically-sealed housing. In more detail, a TOSA consistent with the present disclosure includes a light driving circuit coupled to a hermetically-sealed light engine. The hermetically-sealed light engine includes a housing defined by a plurality of sidewalls. The housing defines a cavity that is hermetically-sealed to prevent introduction of contaminants that would otherwise reduce power. The hermetically-sealed light engine optically couples to an external AWG by way of an optical receptacle. The optical receptacle can include a waveguide implemented via, for instance, an optical isolator, fiber stub, and fiber ferrule section. Thus, the external AWG and associated external optical coupling components, e.g., isolator, fiber stub, fiber ferrule section, advantageously allow for the hermetically-sealed light engine to have a cavity with dimensions relatively smaller than other approaches that dispose an AWG and associated components within a hermetically-sealed cavity.

As used herein, the terms hermetic-sealed and hermetically-sealed may be used interchangeably and refer to a housing that releases a maximum of about $5*10^{-8}$ cc/sec of filler gas. The filler gas may comprise an inert gas such as nitrogen, helium, argon, krypton, xenon, or various mixtures thereof, including a nitrogen-helium mix, a neon-helium mix, a krypton-helium mix, or a xenon-helium mix.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Figure 1A:
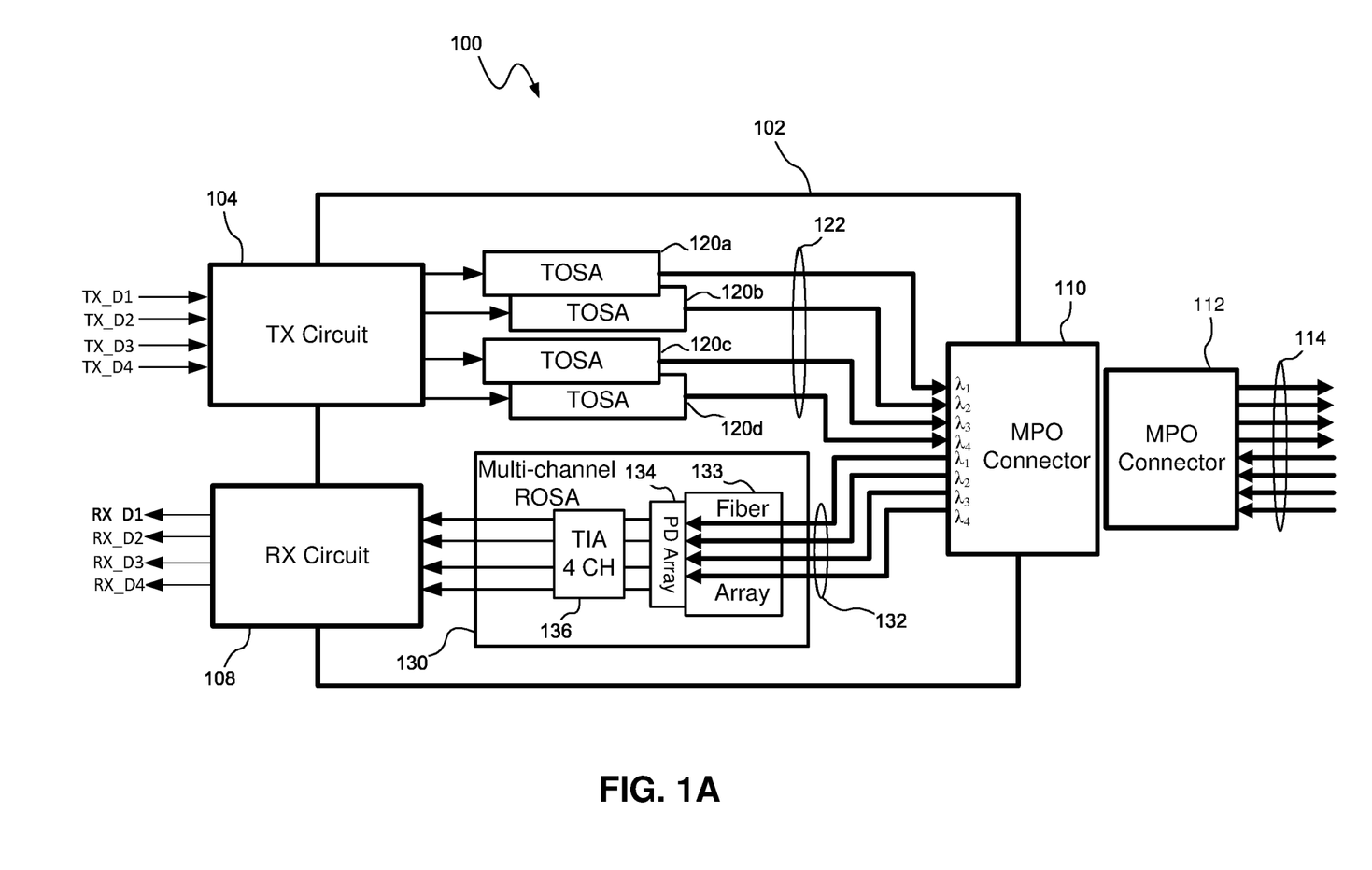
FIGS. 1A and 1B are block diagrams of multi-channel optical transceivers, consistent with embodiments of the present disclosure.

Referring to the Figures, FIG. 1A, an optical transceiver 100, consistent with embodiments of the present disclosure, is shown and described. In this embodiment, the optical transceiver 100 transmits and receives four (4) channels using four different channel wavelengths ($\lambda 1$, $\lambda 2$, $\lambda 3$, $\lambda 4$) and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in internet data center applications or fiber to the home (FTTH) applications.

Although the following examples and embodiments show and describe a 4-channel optical transceiver, this disclosure is not limited in this regard. For example, the present disclosure is equally applicable to 2, 6, or 8-channel configurations.

This embodiment of the optical transceiver 100 includes multiple transmitter optical subassemblies (TOSAs) 120a-d for transmitting optical signals on different channel wavelengths and a multi-channel receiver optical subassembly (ROSA) 130 for receiving optical signals on different channel wavelengths. The TOSAs 120a-d and the multi-channel ROSA 130 are located in a transceiver housing 102.

A transmit connecting circuit 104 and a receive connecting circuit 108 provide electrical connections to the TOSAs 120a-d and the multi-channel ROSA 130, respectively, within the housing 102. The transmit connecting circuit 104 is electrically connected to the electronic components (e.g., the laser, monitor photodiode, etc.) in each of the TOSAs 120a-d and the receive connecting circuit 108 is electrically connected to the electronic components (e.g., the photodiodes, the TIA, etc.) in the multi-channel ROSA 130. The transmit connecting circuit 104 and the receive connecting circuit 108 may be flexible printed circuits (FPCs) including at least conductive paths to provide electrical connections and may also include additional circuitry.

Each of the TOSAs 120a-d may be implemented as the TOSA 200 as discussed in greater detail below. Each TOSA may be electrically coupled to conductive paths on the transmit connecting circuit 104 and be configured to receive driving signals (e.g., TX_D1 to TX_D4) and launch channel wavelengths on to fibers of the transmit optical fibers 122.

A multi-fiber push on (MPO) connector 110 provides optical connections to the TOSAs 120a-d and the multi-channel ROSA 130 within the housing 102. The MPO connector 110 is optically coupled to the TOSAs 120a-d and the multi-channel ROSA 130 via transmit optical fibers 122 and receive optical fibers 132, respectively. The MPO connector 110 is configured to be coupled to a mating MPO connector 112 such that the optical fibers 122, 132 in the optical transceiver 100 are optically coupled to external optical fibers 114.

Continuing on, this embodiment of the multi-channel ROSA 130 shown in FIG. 1A includes a photodetector array 134 including, for example, photodiodes optically coupled to a fiber array 133 formed by the ends of the receive optical fibers 132. The multi-channel ROSA 130 also includes a multi-channel transimpedance amplifier 136 electrically connected to the photodetector array 134. The photodetector array 134 and the transimpedance amplifier 136 detect and convert optical signals received from the fiber array 133 into electrical data signals (RX_D1 to RX_D4) that are output via the receive connecting circuit 108. Other embodiments of a ROSA may also be used in the transceiver 100 for receiving and detecting one or more optical signals.

This embodiment of the optical transceiver 100 does not include an optical multiplexer or demultiplexer. The optical signals may be multiplexed and demultiplexed external to the optical transceiver 100.

Figure 1B:
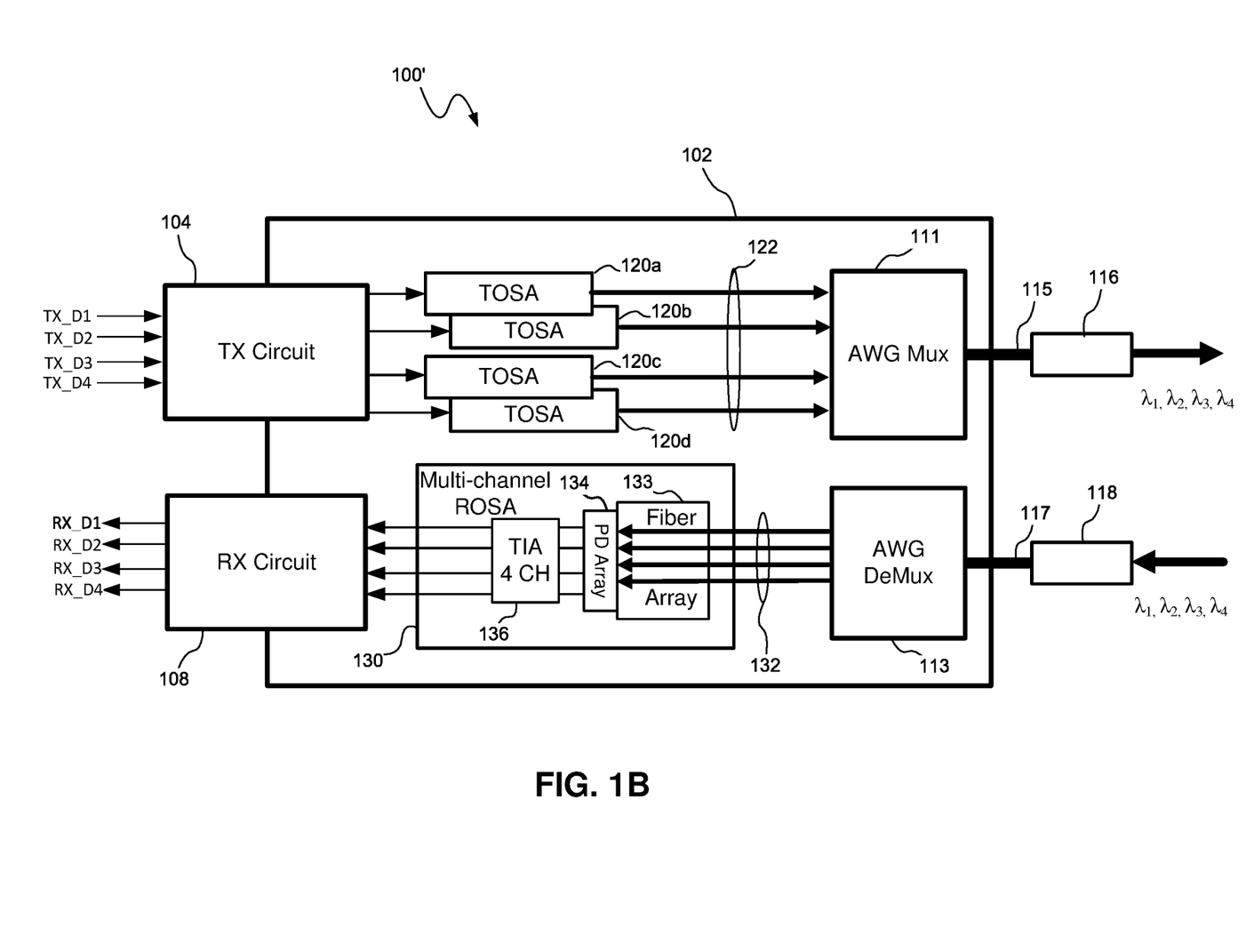

Referring to FIG. 1B, another embodiment of an optical transceiver 100' includes the same light engine (e.g., TOSAs 120a-d and ROSA 130) described above together with an optical multiplexer 111 and an optical demultiplexer 113. The optical multiplexer 111 and the optical demultiplexer 113 both may include arrayed waveguide gratings (AWGs). The optical multiplexer 111 is optically coupled to the transmit optical fibers 122 and the optical demultiplexer 113 is optically coupled to the receive optical fibers 132. The optical multiplexer 111 multiplexes the optical signals being transmitted over transmit optical fibers 122 to provide a multiplexed optical signal on an output optical fiber 115. The optical demultiplexer 113 demultiplexes a multiplexed optical signal received on an input optical fiber 117 to provide received optical signals on receive optical fibers 132. The output optical fiber 115 and the input optical fiber 117 are coupled to an output optical connector 116 and an input optical connector 118, respectively.

This embodiment of the optical transceiver 100' includes 4 channels and may be configured for coarse wavelength division multiplexing (CWDM), although other numbers of channels are possible. This embodiment of the optical transceiver 100' may also be capable of transmission rates of at least about 25 Gbps per channel and transmission distances of 2 km to at least about 10 km and may be used in internet data center applications or fiber to the home (FTTH) applications.

Figures 2A, 2B, 2C:
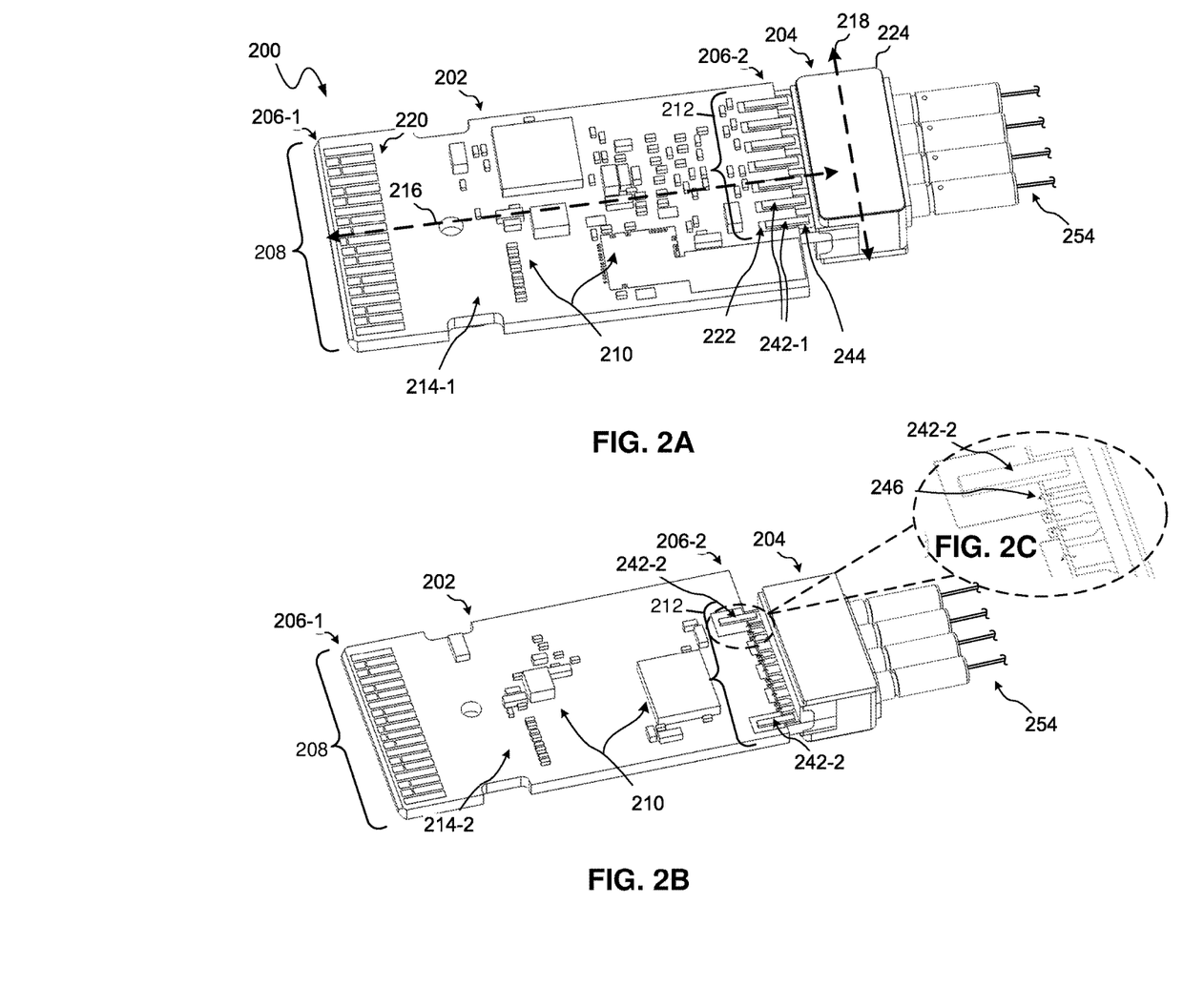
FIG. 2A is a perspective view of a first side of an transmitter optical subassembly (TOSA) module consistent with embodiments of the present disclosure.
FIG. 2B is a perspective view of a second side of the TOSA module of FIG. 2A consistent with embodiments of the present disclosure.
FIG. 2C shows an enlarged region of the second side of the TOSA module shown in FIG. 2B in accordance with an embodiment of the present disclosure.

Referring now to FIGS. 2A-2B, an example transmitter optical subassembly (TOSA) module 200 is shown consistent with an embodiment of the present disclosure. The TOSA module 200 may be implemented as the TOSA arrangement in the optical transceiver 100 and 100' discussed above. As shown, the TOSA 200 includes a substrate 202 and a hermetically-sealed light engine 204 coupled to an end of the substrate 202. In more detail, the substrate 202 includes a first end 206-1 that extends to a second end 206-2 along a longitudinal axis 216. The substrate may comprise a printed circuit board (PCB) formed of silicon or any other material capable of coupling/mounting to electrical components. The substrate 202 includes at least two mounting surfaces for mounting of components, such as mounting surfaces 214-1 and 214-2, which are disposed opposite each other in an opposing arrangement/configuration.

The substrate 202 includes a transmit circuit (TX) interface region 208 proximate the first end 206-1, a light engine interface region 212 proximate the second end 206-2 of the substrate, and a light engine driving circuit 210 disposed therebetween. The TX interface region 208 may include a plurality of terminals/pads 220 for electrically coupling to a transmit connecting circuit, e.g., transmit connecting circuit 104. The TX interface region 208 may therefore receive signals, e.g., power and other signals such as RF, from an associated transmit connecting circuit when coupled thereto. The light engine interface region 212 also includes terminals/pads 222 for electrically coupling to the hermetically-sealed light engine 204.

The light engine driving circuit 210 may include power conversion circuitry and other chips/devices suitable for driving a light engine such as the hermetically-sealed light engine 204. The light engine driving circuit 210 may be disposed on one or more of the mounting surfaces of the substrate 202. For instance, as shown in FIGS. 2A and 2B, the light driving circuit is disposed on both the first and second mounting surfaces 214-1, 214-2. This dual-sided arrangement allows for separation of RF and DC traces which may advantageously minimize or otherwise reduce electrical interference with each other. However, this disclosure is not necessarily limited in this regard and the light driving circuit may be disposed on only one side of the substrate 202 depending on a desired configuration. The light engine driving circuit 210 may electrically couple to the TX interface region 208, and more specifically to the plurality of terminals/pads, via traces. Likewise, the light engine driving circuit 210 may electrically couple to the pads/terminals of the light engine interface region 212 via traces, which are described in greater detail below.

The hermetically-sealed light engine 204 includes a hermetically-sealed housing 224 or housing 224 defined by a plurality of sidewalls. The housing 224 may include a longitudinal axis 218 that extends substantially transverse relative to the longitudinal axis 216 of the substrate 202. The housing 224 may comprise, for example, metal, plastic, ceramic, or any other suitable material. The housing 224 may be formed from multiple pieces, or a single piece, of material.

The housing 224 may further define a laser cavity 226 (FIG. 3) which may be filled with an inert gas to form an inert atmosphere. In one embodiment, the inert atmosphere sealed within the hermetically-sealed container comprises nitrogen, and preferably, 1 atmosphere (ATM) of nitrogen. The inert atmosphere may also be formed from nitrogen, helium, argon, krypton, xenon, or various mixtures thereof, including a nitrogen-helium mix, a neon-helium mix, a krypton-helium mix, or a xenon-helium mix. The inert gas or gas mix included within the hermetically-sealed container may be selected for a particular refractive index or other optical property. Gases may also be selected based on their ability to promote thermal insulation. For instance, Helium is known to promote heat transfer may be utilized alone or in addition to others of the aforementioned gases. In any event, the terms hermetic-sealed and hermetically-sealed may be used interchangeably and refers to a housing that releases a maximum of about $5*10^{-8}$ cc/sec of filler gas.

As shown, the housing 224 may abut (e.g., directly couple to) the second end 206-2 of the substrate 202 and extend therefrom. This may also be referred to as an end-to-end connection between the housing 224 and the substrate 202. The housing 224 may be securely attached to the substrate via an adhesive or other suitable device such as screws, rivets, friction-fit, tongue-and-groove or any combination thereof. However, the housing 224 may not necessarily directly couple to the second end 206-2 of the substrate 202 and the housing 224 may indirectly couple to the second end 206-2 of the substrate 202 via an intermediate device/structure.

Alternatively, or in addition to adhesive or other attachment devices, the housing 224 may be securely attached to the substrate 202 based on electrical interconnect devices (or simply interconnects) soldered or otherwise coupled between the substrate 202 and the housing 224 such as shown in FIGS. 2A and 2B. For example, a first type of interconnects referred to collectively as 242 and individually as 242-1 and 242-2 may be coupled to the substrate 202 by way of respective pads 222. The first type of interconnect devices 242 may be substantially similar in dimension and type, although other embodiments are within the scope of this disclosure. For instance, each of the interconnect devices 242 may have substantially similar dimensions and may each comprise copper, aluminum, steel or any other suitably conductive metal or metal alloy. In other cases, the interconnect devices 242-1 may comprise a different metal material than that of the interconnect devices 242-2 and have different dimensions. In one specific example embodiment, the interconnect devices 242 comprise DC bus bar interconnects.

As shown, the interconnects 242-1 may be coupled to the first surface 214-1 of the substrate 202 and the interconnects 242-2 may be disposed opposite the interconnects 242-1 on the second surface 214-2 of the substrate 202. This opposing configuration/arrangement of interconnects may increase structural stability of the interface between the housing 224 and the substrate 202 versus only coupling interconnects on only one side of the substrate 202. In this embodiment, each of the first interconnect devices 242-1 may be disposed in a coextensive manner with corresponding ones of the second interconnect devices 242-2, although in other cases the interconnect devices may be disposed in a staggered manner and may not necessarily be coextensive. In some cases the interconnects 242 may only be coupled on one side to provide electrical communication between the substrate 202 and the housing 224 and this disclosure should not be construed as limiting in this regard.

In any event, the interconnect devices 242 may be suitably rigid, and thus prevent or otherwise mitigate rotational movement of the housing 224 relative to the substrate 202. A substantial portion, e.g., greater than 50%, of the bottom surface of each of the interconnect devices 242 may couple to the pads 222 of the substrate 202. This may allow the interconnect devices 242 to have a relatively large amount of surface area in contact with the substrate 202 to allow for additional soldering. The additional soldering may further increase structural support and securely hold the housing 224 in position relative to the substrate 202. Thus, in some cases, the ratio of surface area of each of the interconnects 242 coupled to the substrate 202 relative to the housing 224 may be 2:1, 3:1, 4:1, 6:1, or any ratio therebetween.

In an embodiment, each of the interconnect devices 242 may form a substantially continuous electrical conductor when electrically coupled, e.g., when soldered or otherwise electrically coupled, to associated pads 222 of the substrate 202 and the pads 244 of the housing 224. The continuous electrical conductor may be straight, e.g., without bends. Although the interconnects 242-2 may be configured to carry a DC signal, the associated pads of the substrate 202 and the housing 224 may not necessarily be electrically coupled to the light engine driving circuit 210 and the laser packages 240, which may also be referred to as laser transmitter arrangements or simply laser arrangements (See FIG. 3). Instead, the interconnects 242-2 may be electrically isolated and may simply be present to provide structural support (e.g., to prevent rotational movement) between the substrate 202 and the housing 224 and/or a ground connection. Alternatively, one or more of the interconnects 242-2 may be electrically isolated while others may be utilized to provide a DC signal between the substrate 202 and the hermetically-sealed light engine 204.

Continuing on, a second type of interconnect 246 may electrically couple the substrate 202 to the hermetically-sealed light engine 204 to provide RF signaling. The second type of interconnect 246 may comprise wire bonding, as shown, although other types of interconnect devices may be utilized. As shown, the embodiment of FIGS. 2B and 2C include a plurality of the second type of interconnect 246. Wire bonding may be particularly well suited for transmission of high-frequency RF signals. However, wire bonding can be easily damaged based on, for instance, movement between the substrate 202 and the housing 224. In an embodiment, the first interconnect devices 242 may introduce rigidity and a secure connection between the substrate 202 and the housing 224 to prevent or otherwise mitigate the potential for such damage.

Figure 3:
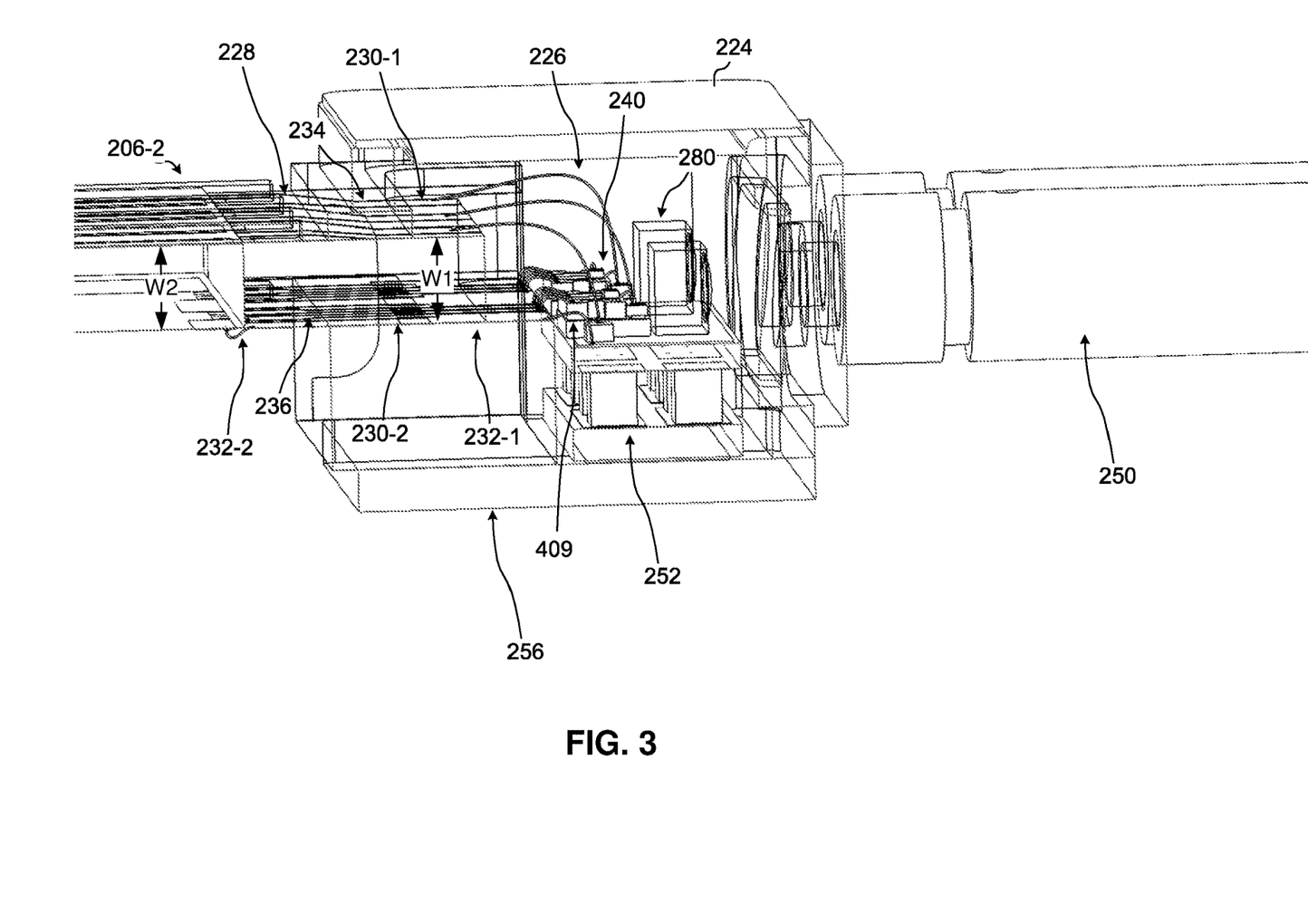
FIG. 3 shows a cross-sectional view of a hermetically-sealed housing consistent with an embodiment of the present disclosure.

FIG. 3 shows a cross-sectional view of the housing 224 consistent with an embodiment of the present disclosure. As shown, the housing 224 includes a plurality of sidewalls that define cavity 226. The cavity 226 includes laser packages 240 disposed therein. The laser packages 240 may be configured to launch associated channel wavelengths into a fiber, e.g., one of fibers 254 (See FIG. 2B), and/or other waveguide disposed in connector/receptacle 250. Note, the fibers 254 may be implemented as the transmit optical fiber 122 of FIGS. 1A and 1B. Focusing lenses, e.g., focus lens 280, may be disposed within the cavity 226 and aligned with associated laser packages to launch light emitted from the same into a fiber or waveguide of receptacle 250. The cavity 226 may also include temperature control devices 252 in thermal communication with the laser packages 240. The temperature control devices 252 may comprise TECs or other suitable devices. The temperature control devices 252 may also be in thermal communication with the bottom sidewall 256 to allow for transfer of heat. Therefore, the temperature control devices 252 may advantageously disperse heat through a metal housing (or other housing) that the housing 224 may be disposed in.

The cavity 226 may be at least partially formed by a feedthrough device 228, which may also be referred to as a passthrough device 228. The feedthrough device 228 may comprise, for example, a suitably rigid non-metal material such as inorganic material such as a crystalline oxide, nitride or carbide material, which may be commonly referred to as ceramic. Some elements, such as carbon or silicon, may also be considered ceramics, and are also within the scope of this disclosure. A first portion 232-1 of the feedthrough device 228 may at least partially extend into the cavity and a second portion 232-2 may extend from the cavity 226.

The feedthrough device 228 may be defined by at least a first mounting surface 230-1 and a second mounting surface 230-2 disposed opposite the first surface 230-1 in an opposing arrangement/configuration. Each of the first and second mounting surfaces 230-1 and 230-2 may include traces disposed/patterned thereon, and may also be referred to herein as simply first and second surfaces 230-1, 230-2. For example, the first surface 203-1 may include power traces 234 (or DC traces 234) disposed thereon that are configured for transmission of DC signals. On the other hand, the second surface 230-2 may include traces 236 (or RF traces 236) disposed thereon that are configured for transmission of RF signals. The feedthrough device 228 may include a width (or thickness) of W1, with W1 being between 0.1 mm to 2 mm, although other dimensions are within the scope of this disclosure. The width W1 may be configured to allow the feedthrough device 228 to prevent or otherwise reduce electrical interference between the DC and RF signals carried by the traces 234 and 236, respectively. The width W1 of the feedthrough device 228 may be equal to the width W2 of the substrate 202. However, the widths W1 and W2 may not necessarily be equal and width W2 may be greater or less than the width W1. As further shown, the first and second mounting surfaces 214-1, 214-2 of the substrate 202 may extend in parallel, and may be substantially coplanar, with the first and second surfaces 230-1, 230-2 of the feedthrough device 228 when the substrate 202 and the feedthrough device 228, are coupled together.

Continuing on, a first end of the DC traces 234 may be electrically coupled to the substrate 202, and more particularly, the light engine driving circuit 210 via respective interconnect devices, such as the first type of interconnect devices 242-1. The second end of the DC traces 234 on the first surface 230-1 of the feedthrough device 228 may then be wire bonded, such as shown, or otherwise electrically coupled to the laser transmitter arrangements 240 via a suitable approach. Each laser transmitter arrangement 240 may comprise, for instance, a laser diode and a monitor photodiode and may be configured to emit an associated channel wavelength. Likewise, a first end of the RF traces 234 electrically couple to the light engine driving circuit 210 via respective interconnect devices, e.g., the second type of interconnect devices 242-2, and a second end electrically couples to the laser transmitter arrangements 240 via wire bonding or other suitable approach.

Figure 4:
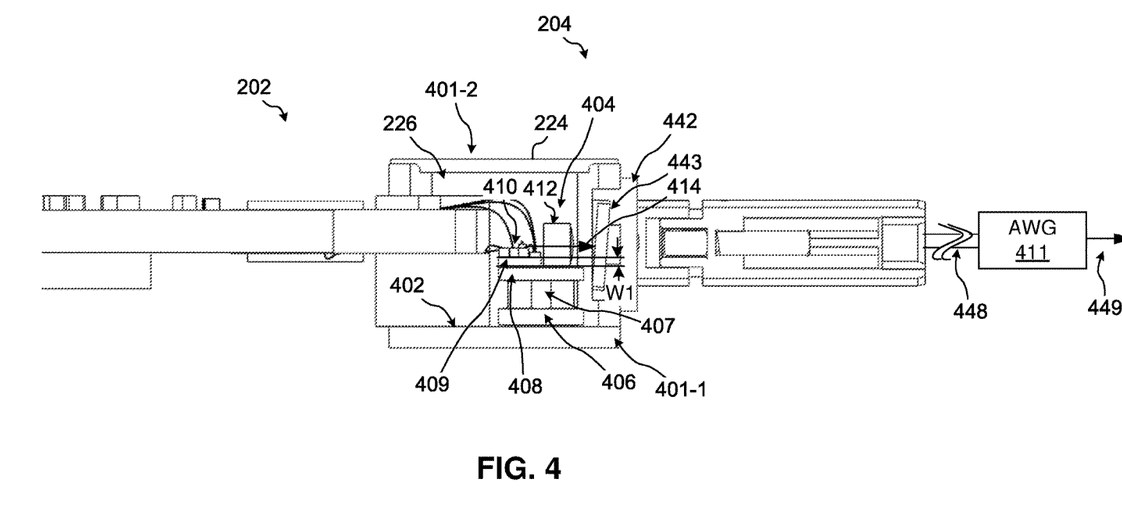
FIG. 4 shows another cross-sectional view of a hermetically-sealed housing consistent with the present disclosure.
Figure 5:
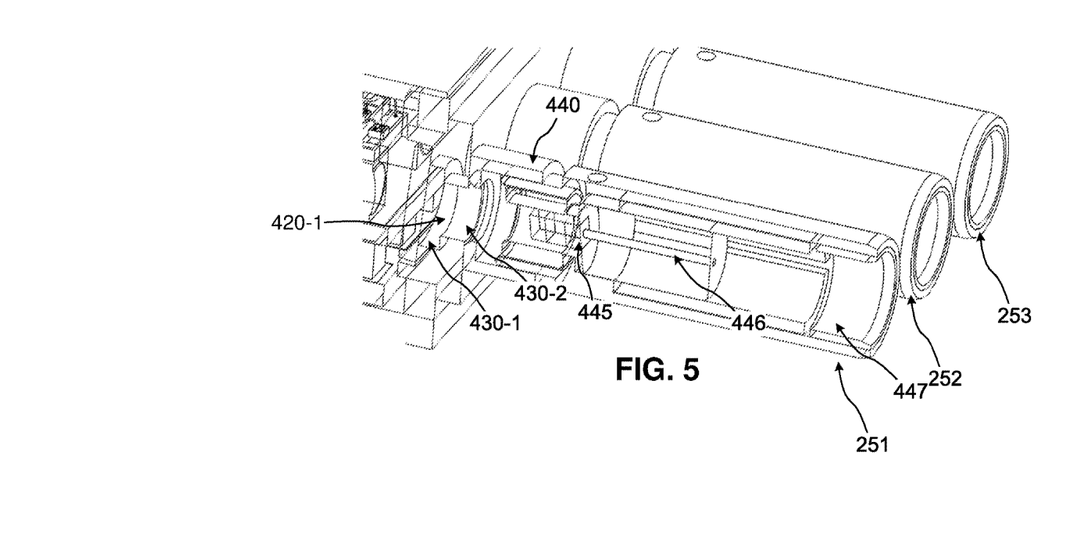
FIG. 5 shows a cross-sectional view of a fiber receptacle for use with a hermetically-sealed housing consistent with the present disclosure.

FIGS. 4-5 show additional aspects of the TOSA 200 consistent with aspects of the disclosure. As shown the housing 224 is defined by a plurality of sidewalls including at least a first sidewall 401-1 and a second sidewall 401-2. As discussed above, the housing 224 may comprise metal, and therefore, the sidewalls defining the housing 224 may be formed from metal. Metal is particularly well suited for heat transfer and the sidewalls may be well suited for communicating/transferring heat from optical components within the cavity 226. The sidewalls may also be in communication with sidewalls of a transceiver housing, for instance, and may also be capable of communicating and dispersing the heat via the transceiver housing.

The first and second sidewalls 401-1 and 401-2 may be defined by at least one surface that extends substantially in parallel with the surfaces 214-1 and 214-2 (FIG. 2A/2B) that define the first and second surfaces of the substrate 202. The first and second sidewalls 401-1 and 401-2 may be disposed opposite each other in an opposing arrangement. The first and second sidewalls 401-1 and 401-2 may at least partially define the cavity 226.

The first sidewall 401-1 provides at least a first mounting surface 402. The first mounting surface 402 may be substantially flat, although this disclosure is not necessarily limited in this regard. As shown, the cavity 226 includes a temperate controlled laser arrangement 404 disposed on the mounting surface 402. In particular, the temperature controlled laser arrangement includes a first TEC sub-mount 406, TEC devices 407, a second TEC sub-mount 408, a laser sub-mount 409, a plurality of laser diodes 410, and a plurality of focus lens 411. The first sub-mount 406 may be disposed on the mounting surface 402 and may be used to support the stack of components as shown. A plurality of TEC devices 407 may then be disposed on the first TEC sub-mount 406. A second TEC sub-mount 408 may then be disposed on a top surface of the TEC devices 407 such that the upper surface of the TEC devices 407 directly couples to a bottom surface of the second TEC sub-mount 408. In some cases, the TEC devices 407 may not necessarily directly couple to the second TEC sub-mount 408, and this disclosure is intended to be limiting in this regard. The TEC devices 407 may therefore support the TEC devices 407 and allow for thermal communication between the seconds TEC sub-mount 408 and the first TEC sub-mount 406.

A second, or upper surface, of the second TEC sub-mount 408 may then provide a mounting surface (or support surface) for the laser diode sub-mount 409 and the focus lens 412 (or collimating lens 412). The laser diode sub-mount 409 includes at least one mounting surface for coupling to a laser diode 410 and associated circuitry. As shown in FIG. 3, the laser diode sub-mount 409 may be coupled to a plurality of laser devices, although in some cases, a separate laser diode sub-mount may be provided for each laser diode device.

Continuing on, the laser diode sub-mount 409 may include a width W1 that supports and aligns each laser diode 410 such that laser light is launched into substantially a center of each of associated focus lens 412 along a light path generally shown at 414. The cavity 226 may further include lens 443 disposed along the light path 414. The lens 443 may be angled at about 2-8 degrees relative to the light path 414 to reduce back reflection and ensure optimal coupling efficiency.

Figure 6:
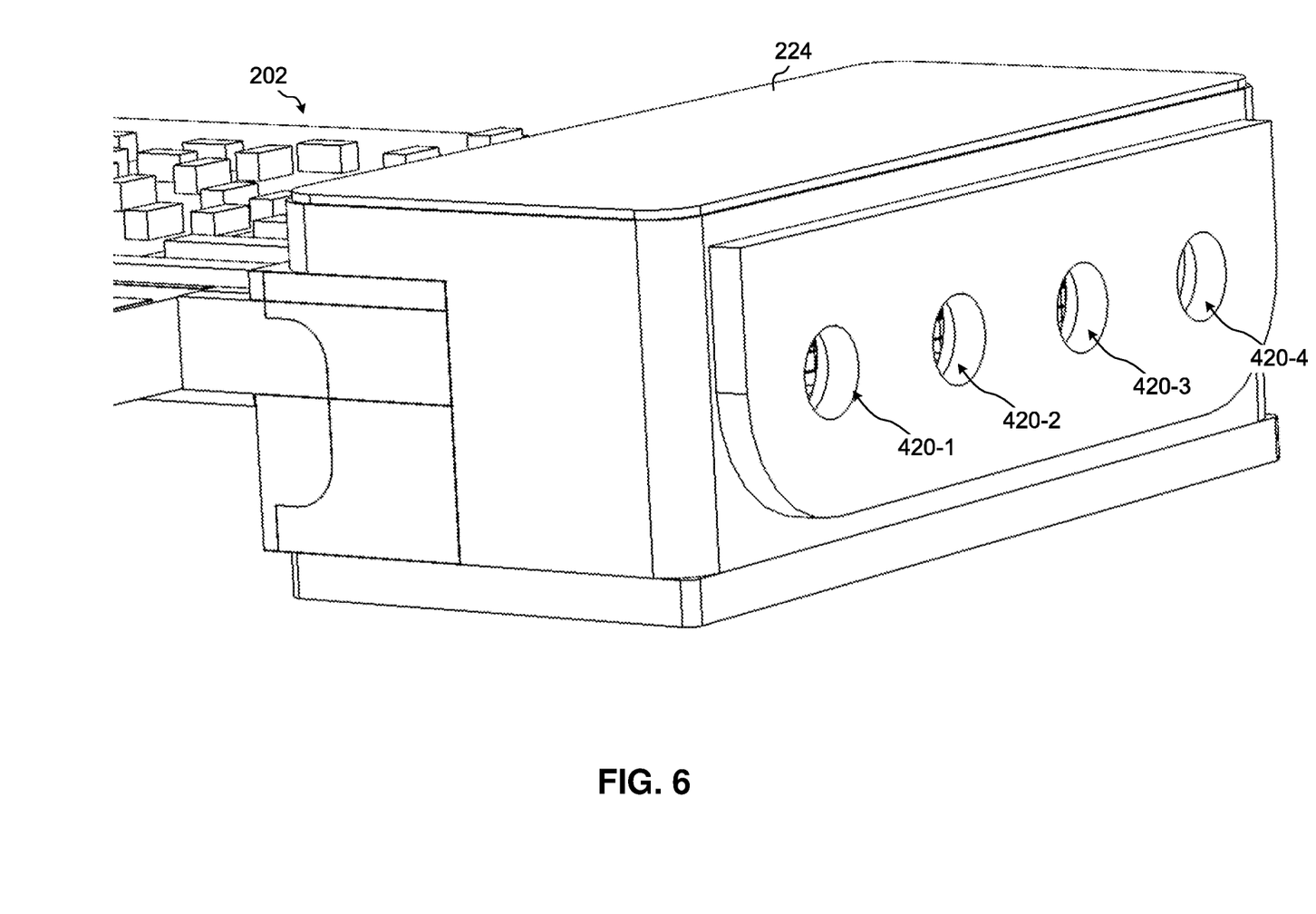
FIG. 6 shows a perspective view of a hermetically-sealed housing consistent with the present disclosure.

The housing 224 may further include a sidewall that includes a plurality of apertures 420-1 to 420-4, which are shown more clearly FIG. 6. Each of the plurality of apertures 420-1 to 420-4 may be defined by a plurality of apertures with different radiuses. For instance, aperture 420-1 includes a first aperture 430-1 that transitions to a second aperture 430-2. The first aperture 430-1 may be adjacent an associate laser diode and focus lens, and the second aperture 430-2 may be adjacent the receptacle 250. The first aperture 430-1 may include a larger radius than the second aperture 430-2. As discussed above, each of the apertures 420-1 to 420-4 allows for associated channel wavelengths to launch from the cavity 226.

Continuing on, each fiber coupling receptacle 250 to 253 couples to the housing 224 by way of a welding ring, e.g., welding ring 440, and a receptacle mount 442. Each receptacle 250-253 may further include a light path/wave guide that includes an optical isolator 445 and a fiber stub 446, and a ferrule/fiber receiving portion 447, although other embodiments are within the scope of this disclosure.

As shown in FIGS. 4 and 5, each receptacle 250-253 allows an intermediate waveguide, e.g., waveguide 448, to optically couple to an arrayed waveguide grating (AWG) 411. The AWG 441 may then multiplex channel wavelengths received via each of the intermediate waveguides, e.g., provided by way of apertures 420-1 to 420-4 and output a multiplexed optical signal 449. The multiplexed optical signal 449 may then be launched via output optical fiber, e.g., output optical fiber 115 of FIG. 1B.

As shown, each fiber coupling receptacle 250 to 253, and by extension the optical isolator 445 and fiber stub 446, intermediate waveguide 448, and the AWG 411 are disposed external to the cavity 226. Note, while an AWG 411 is shown other multiplexing devices, such as filters, may be utilized and are within the scope of this disclosure. Thus, the number of components within the cavity 226 are reduced which allows the cavity 226 to be hermetically-sealed, but with dimensions that reduce manufacturing complexity and cost. This further allows for the external optical components to be coupled/mounted to the housing 224 before or after forming the hermetic-seal of the housing 224 and enables greater serviceability as components external to the hermetic-sealed cavity 226 may be more easily replaced/repaired relative to those residing within the hermetic-sealed cavity 226. In addition, the size of the TECs and/or the number of the TECs may be reduced as the cavity 226 may be smaller, which may reduce the number of components to heat/cool and the area surrounding the components. The use of relatively small TECs and/or fewer overall components may reduce power consumption related to heat/cooling and further reduce overall cost and manufacturing complexity.

In an accordance with an aspect of the present disclosure a transmitter optical subassembly (TOSA) module is disclosed. The TOSA module comprising a hermetically-sealed light engine with a housing that defines a hermetic-sealed cavity and a plurality of laser devices for emitting a plurality of associated channel wavelengths disposed within the hermetic-sealed cavity, and a multiplexing device disposed externally from the hermetic-sealed cavity and optically coupled to the hermetically-sealed light engine to receive the plurality of associated wavelengths and output a multiplexed signal base.

In accordance with another aspect of the present disclosure an optical transceiver is disclosed. The optical transceiver comprising a housing, a transmitter optical subassembly (TOSA) module disposed in the housing, the TOSA module comprising a hermetically-sealed light engine with a housing that defines a hermetic-sealed cavity and at least one laser package disposed within the hermetic-sealed cavity, an arrayed waveguide grating (AWG) disposed externally from the hermetic-sealed cavity and optically coupled to the hermetically-sealed light engine to receive the plurality of associated wavelengths and output a multiplexed signal base, and a receive optical subassembly (ROSA) module disposed in the housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A transmitter optical subassembly (TOSA) module comprising:
   a hermetically-sealed light engine with a housing that defines a hermetic-sealed cavity and a plurality of laser devices for emitting a plurality of associated channel wavelengths disposed within the hermetic-sealed cavity, wherein the housing further includes a thermoelectric cooler (TEC) sub-mount disposed within the hermetic-sealed cavity, and wherein the plurality of laser devices are mounted to the TEC sub-mount;
a multiplexing device disposed externally from the hermetic-sealed cavity and optically coupled to the hermetically-sealed light engine to receive the plurality of associated wavelengths and output a multiplexed signal base;
a substrate defined by first and second surfaces disposed opposite each other, the substrate including an electrical coupling region for electrically coupling with a transmit connecting circuit and a light engine interface region for electrically coupling with the hermetically-sealed light engine;
a light engine driving circuit disposed on the substrate to provide a radio frequency (RF) signal and a power signal to drive the hermetically-sealed light engine to output one or more channel wavelengths; and
wherein the substrate includes at least a first trace disposed on the first surface to provide the power signal and at least a second trace disposed on the second surface to provide the RF signal, the first and second traces being disposed in an opposing arrangement to provide electrical isolation to reduce electrical interference between the power signal and the RF signal.

2. The TOSA module of claim 1, wherein the TOSA module comprises an optical coupling receptacle mounted to the hermetically-sealed light engine, and wherein the optical coupling receptacle includes a waveguide provided at least in part by a fiber stub, the fiber stub being external to the hermetic-sealed cavity.

3. The TOSA module of claim 1, further comprising at least a first interconnect device of a first type electrically coupled to the first trace and a corresponding trace of the hermetically-sealed light engine housing to provide the power signal, and at least a second interconnect device of a second type electrically coupled to the second trace and a corresponding trace of the hermetically-sealed light engine housing to provide the RF signal, the first and second types of interconnect devices being different.

4. The TOSA module of claim 3, wherein the first type of interconnect device is a DC bus bar interconnect.

5. The TOSA module of claim 3, wherein the second type of interconnect device is a wire bond.

6. The TOSA module of claim 1, wherein the electrical isolation is provided at least in part by a width of the substrate and/or material properties of a material that forms the substrate.

7. The TOSA module of claim 1, further comprising a plurality of electrical interconnects that brace the substrate to the housing of the hermetically-sealed light engine.

8. The TOSA module of claim 1, wherein the hermetically-sealed light engine housing further includes a feedthrough device to electrically couple the plurality of laser devices to the light engine driving circuit.

9. The TOSA module of claim 8, wherein the feedthrough device is configured to directly couple to the substrate with an end-to-end connection.

10. The TOSA module of claim 8, wherein the feedthrough device is defined by at least a first surface disposed opposite a second surface, and wherein the first and second surfaces extend substantially parallel with the first and second surfaces of the substrate.

11. The TOSA module of claim 10, further comprising at least one trace for receiving the power signal from the light engine driving circuit disposed on the first surface of the feedthrough and at least one trace for receiving the RF signal from the light engine driving circuit disposed on the second surface.

12. An optical transceiver comprising:
a housing;
a transmitter optical subassembly (TOSA) module disposed in the housing, the TOSA module comprising:
a hermetically-sealed light engine with a housing that defines a hermetic-sealed cavity and at least one laser package disposed within the hermetic-sealed cavity, wherein the housing further includes a thermoelectric cooler (TEC) sub-mount disposed within the hermetic-sealed cavity, and wherein the at least one laser package is mounted to the TEC sub-mount;
an arrayed waveguide grating (AWG) disposed externally from the hermetic-sealed cavity and optically coupled to the hermetically-sealed light engine to receive a plurality of associated wavelengths and output a multiplexed signal base;
a receive optical subassembly (ROSA) module disposed in the housing;
a substrate defined by first and second surfaces disposed opposite each other, the substrate including an electrical coupling region for electrically coupling with a transmit connecting circuit and a light engine interface region for electrically coupling with the hermetically-sealed light engine;
a light engine driving circuit disposed on the substrate to provide a radio frequency (RF) signal and a power signal to drive the hermetically-sealed light engine to output one or more channel wavelengths; and
wherein the substrate includes at least a first trace disposed on the first surface to provide the power signal, and at least a second trace disposed on the second surface to provide the RF signal, the first and second traces being disposed in an opposing arrangement to provide electrical isolation to reduce electrical interference between the power signal and the RF signal.

13. The optical transceiver of claim 12, wherein the TOSA module comprises an optical coupling receptacle mounted to the hermetically-sealed light engine, and wherein the optical coupling receptacle includes a waveguide provided at least in part by a fiber stub, the fiber stub being external to the hermetic-sealed cavity.

14. The optical transceiver of claim 12, wherein the TOSA module further comprises a first plurality of interconnect devices to provide a power signal from the light engine driving circuit to the at least one laser package of the hermetic-sealed cavity, and wherein the first plurality of interconnect devices brace the hermetically-sealed light engine to the substrate.

15. The optical transceiver of claim 12, wherein the TOSA module further comprises DC bus bars disposed on the first and second surfaces of the substrate.

16. The optical transceiver of claim 12, wherein the TOSA module further comprises a second plurality of interconnect devices to provide an RF signal from the light engine driving circuit to the at least one laser package of the hermetic-sealed cavity, and wherein the second plurality of interconnect devices are wire bonds.

17. A transmitter optical subassembly (TOSA) module comprising:
a hermetically-sealed light engine with a housing that defines a hermetic-sealed cavity and a temperature controlled laser arrangement thermally coupled to a sidewall within the hermetic-sealed cavity, the temperature controlled laser arrangement including a thermoelectric cooler (TEC) sub-mount and a plurality of laser devices disposed on the TEC sub-mount within the hermetic-sealed cavity for emitting a plurality of associated channel wavelengths;

a multiplexing device disposed externally from the hermetic-sealed cavity and optically coupled to the hermetically-sealed light engine to receive the plurality of associated wavelengths and output a multiplexed signal base; and a substrate defined by first and second surfaces disposed opposite each other, the substrate including an electrical coupling region for electrically coupling with a transmit connecting circuit and a light engine interface region for electrically coupling with the hermetically-sealed light engine;

a light engine driving circuit disposed on the substrate to provide a radio frequency (RF) signal and a power signal to drive the hermetically-sealed light engine to output one or more channel wavelengths; and wherein the substrate includes at least a first trace disposed on the first surface to provide the power signal, and at least a second trace disposed on the second surface to provide the RF signal, the first and second traces being disposed in an opposing arrangement to provide electrical isolation to reduce electrical interference between the power signal and the RF signal.

18. The TOSA module of claim 17, wherein the hermetic sealed cavity includes an inert atmosphere comprising an inert gas.

\* \* \* \* \*